United States Patent
Schuessler et al.

(10) Patent No.: US 6,332,575 B1
(45) Date of Patent: Dec. 25, 2001

(54) AUDIBLE INDICATORS FOR OPTICAL CODE READING SYSTEMS

(75) Inventors: Fredrick Schuessler, Baiting Hollow; Edward Barkan; Ted Koontz, both of Miller Place; Cary Chu, Pt. Jefferson; Chin-Hung Jwo, Mount Sinai; Hal Charych, E. Setauket, all of NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/182,205

(22) Filed: Oct. 30, 1998

Related U.S. Application Data

(60) Provisional application No. 60/063,782, filed on Oct. 31, 1997.

(51) Int. Cl.[7] .................. G06K 7/10; G06K 15/00
(52) U.S. Cl. .................. 235/462.13; 235/462.25
(58) Field of Search ..................... 235/462.13, 383, 235/454, 459, 462.14, 0.32, 0.43, 0.08, 0.1, 0.25, 470

(56) References Cited

U.S. PATENT DOCUMENTS

| | | | |
|---|---|---|---|
| 4,760,248 | 7/1988 | Swartz et al. | 235/472.01 |
| 4,779,706 * | 10/1988 | Morgenthaler | 235/383 X |
| 4,806,742 | 2/1989 | Swartz et al. | 235/472.01 |
| 4,816,660 | 3/1989 | Swartz et al. | 235/472.01 |
| 4,825,057 | 4/1989 | Swartz et al. | 235/472.01 |
| 4,835,374 | 5/1989 | Swartz et al. | 235/472.01 |
| 4,868,375 * | 9/1989 | Blanford | 235/462.25 X |
| 4,897,532 | 1/1990 | Swartz et al. | 235/472.01 |
| 5,019,694 * | 5/1991 | Collins, Jr. | 235/383 |
| 5,019,714 | 5/1991 | Knowles . | |
| 5,144,114 * | 9/1992 | Wittensoldner et al. | 235/375 |
| 5,252,814 | 10/1993 | Tooley . | |
| 5,495,097 | 2/1996 | Katz et al. | 235/462.01 X |
| 5,594,228 * | 1/1997 | Swartz et al. | 235/383 |
| 5,856,660 * | 1/1999 | Bard et al. | 235/462.15 |
| 5,979,758 * | 11/1999 | Swartz et al. | 235/383 |
| 6,039,258 * | 3/2000 | Durbin et al. | 235/472.01 |

FOREIGN PATENT DOCUMENTS

| | | |
|---|---|---|
| 533 365 A2 | 3/1993 | (EP) . |
| 595 371 A2 | 5/1994 | (EP) . |
| 764 417 A1 | 3/1997 | (EP) . |

\* cited by examiner

*Primary Examiner*—Karl D. Frech
(74) *Attorney, Agent, or Firm*—Burns, Doane, Swecker & Mathis, L.L.P.

(57) ABSTRACT

A system for reading optical codes, and more particularly to code reading systems with sound signal generators, modules a sound detector detects an ambient sound level in a vicinity of the system operator and the volume of the audible indicator is controlled in response to the detected ambient sound level. The sound may be produced by a transducer located in a raised rail adjacent the system operator. Various kinds of audio signals may be produced, for example, to distinguish the system's response from those of nearby optical code reading systems or to identify the kind of optical code symbology being read or its informational content.

23 Claims, 15 Drawing Sheets

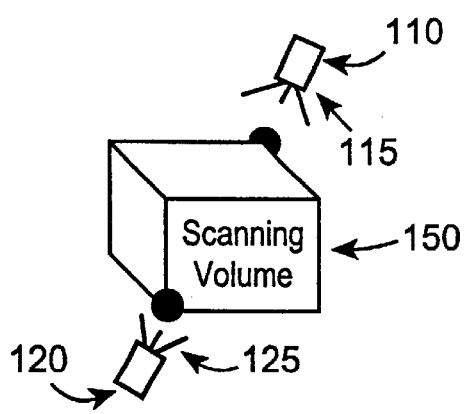
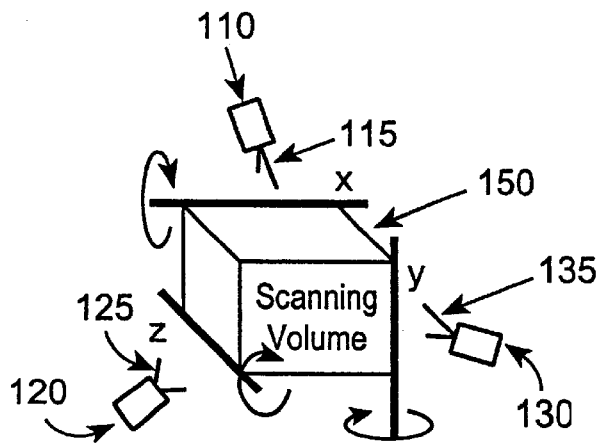
FIG. 3(a)    FIG. 3(b)
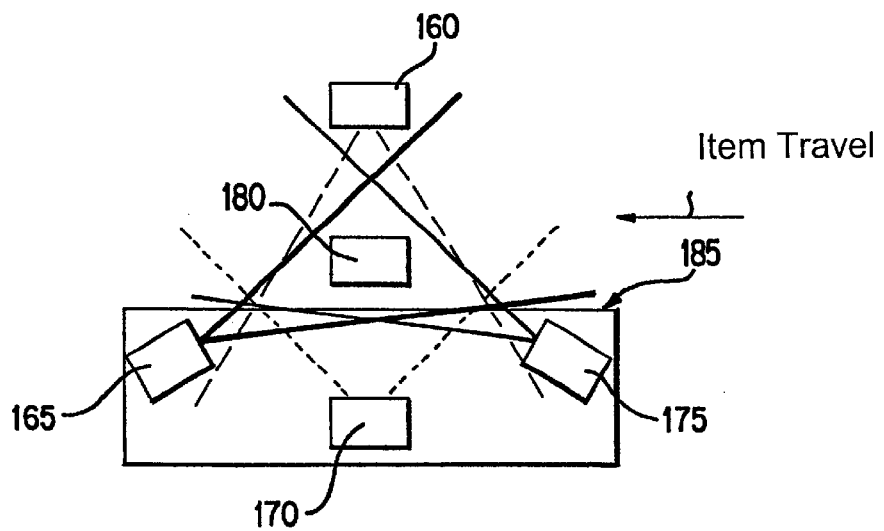
FIG. 4

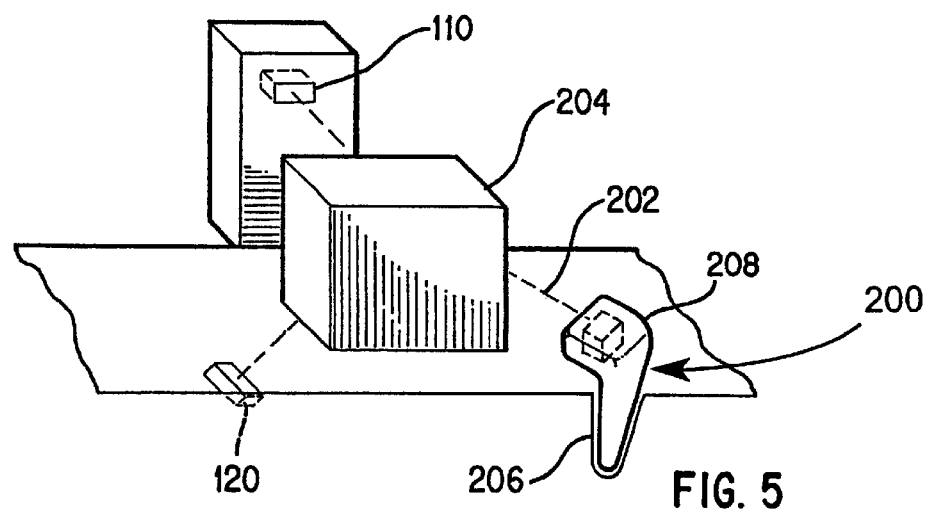
FIG. 5
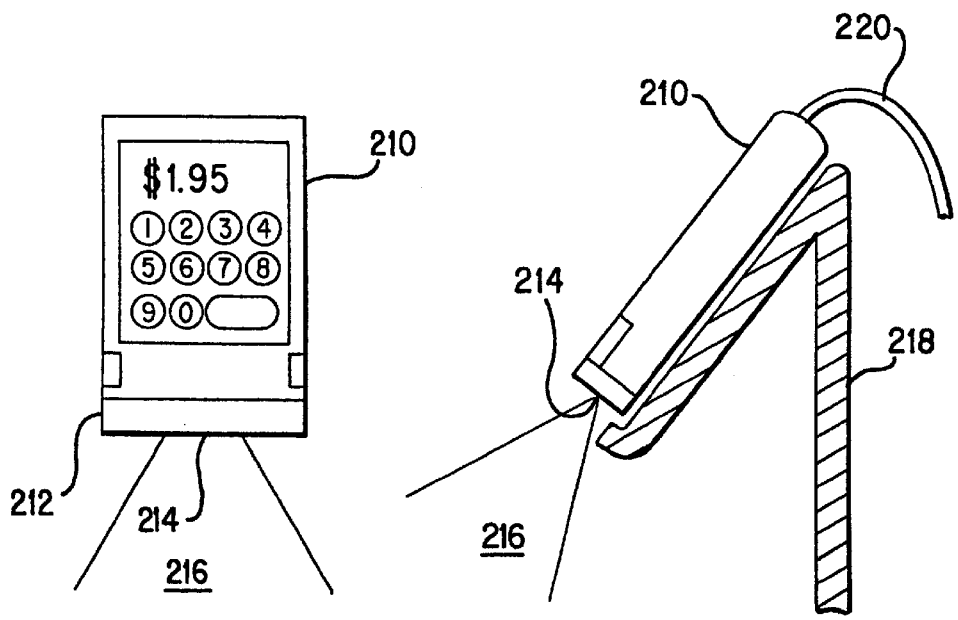
FIG. 6(a)
FIG. 6(b)

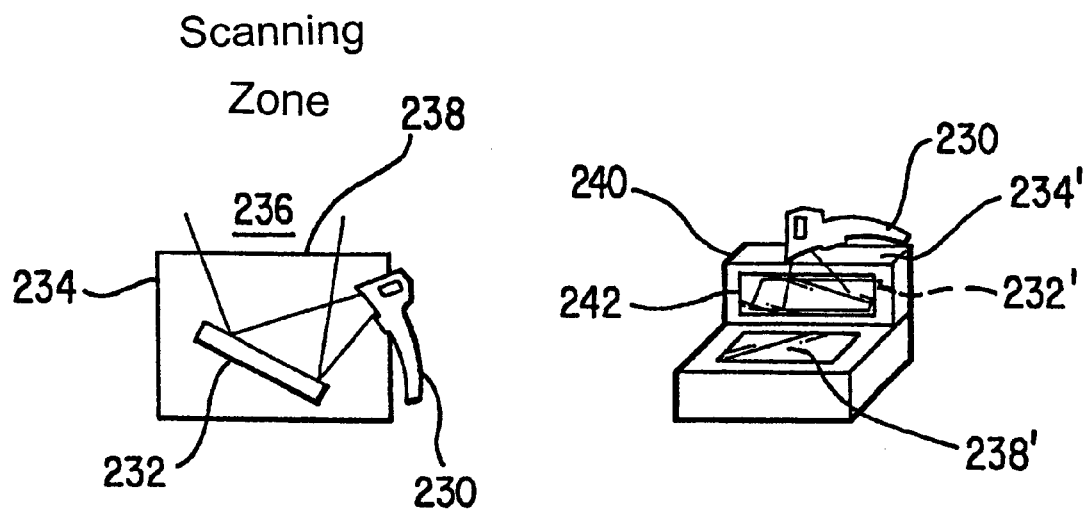
FIG. 7(a)
FIG. 7(b)
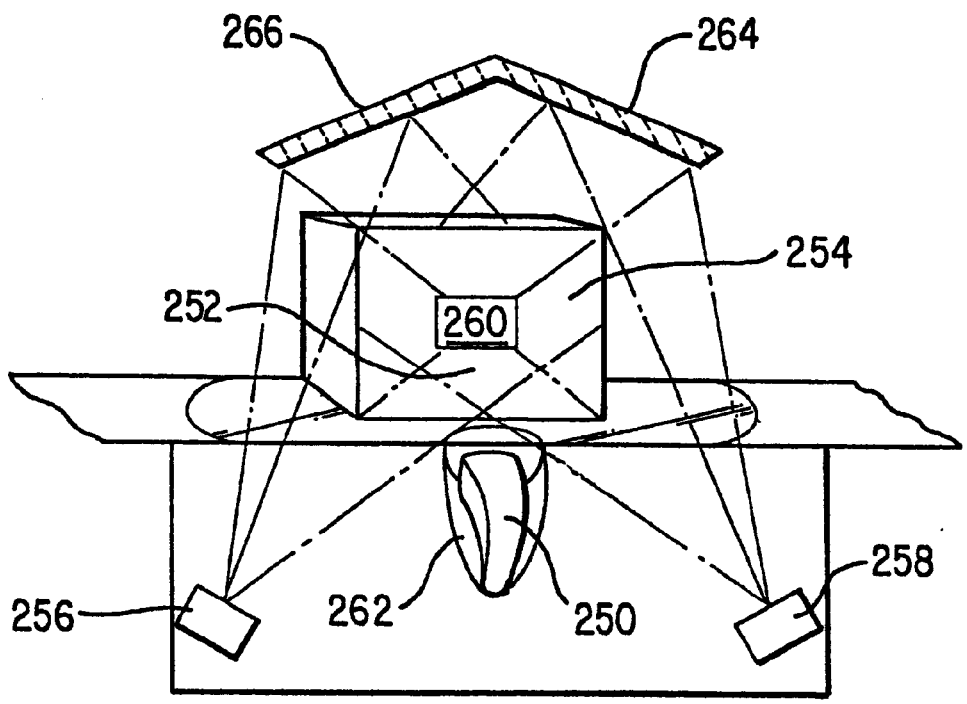
FIG. 8

AUDIBLE INDICATORS FOR OPTICAL CODE READING SYSTEMS

RELATED APPLICATIONS

This application claims priority to Provisional Application Ser. No. 60/063,782 filed Oct. 31, 1997 to F. Schuessler and C. Chu, which is hereby incorporated by reference.

FIELD OF THE INVENTION

The present invention relates to systems used in reading optical code symbols, and more particularly to audible indicators associated with a point of sale installation or code reading terminal.

BACKGROUND AND OBJECTS

Optical systems for reading optical code symbols such as bar code, matrix code and two-dimensional symbologies are well known. Some known imaging optical code reading systems are capable of reading a variety of different codes from various angles and distances. Generally, imagers and laser beam scanning systems electro-optically transform optical code into electrical signals which are decoded into alpha-numerical characters or other data. These data are in digital form and are used as input to a data processing system in, for example, a point of sale (POS) environment for looking up a price for the article.

Laser scanner modules and imaging optical code reading modules typically have a field of view centered about an optical axis or line of sight. Ideally the scanner module or imager module reads a bar code in the working range located on an optical plane substantially perpendicular to the line of sight. However, most scanner modules and imager modules can effectively read codes on many other planes and surfaces at a variety of different angles and orientations within the field of view.

Early scanning systems were constructed with single aiming axes or fields of view, and required precise positioning of the code symbol with respect to the scanning head.

Scanners with two planar scanning windows oriented at an angle to one another have become popular for both supermarkets and mass merchandisers. Such scanners increase the checkout throughput, which is important in environments where large numbers of articles products are scanned. With one planar scan module, an operator has to ensure that the bar code symbol is oriented in the single field of view and at a working distance that enables a beam to read the symbol. Systems with two window scanners reduce the amount of manipulation that the operator has to perform in properly positioning the article for scanning. In a two window scanner system, the operator only has to ensure that the bar code symbol is read throughout at least one of the scan windows. Such systems may include a horizontal scanning window and a generally vertical scanning window from which laser lines for scanning bar code symbols originate. Typically, an operator is situated on the side of the scanner that is opposite the vertical scanning window.

Some such scanners can perform adequately in reading bar code symbols on any of four sides of an article positioned in the system. These sides are, from an operator's point of view, the side of the article facing down, the side of the article positioned away from the operator (facing the vertical window), the leading side of the article (the side pointing in the article's direction of travel) and the trailing side of the article. One known scanner, the Spectra Physics Magellan Scanner, also attempts to read symbols positioned on the side opposite to a vertical window (i.e., the side of the article facing the operator), but it is only successful when the article is positioned at least a predetermined distance from the operator or if the symbol is very close to the bottom of the article. The laser lines that read symbols on this side of the scanner are emitted though the horizontal scanning window on which the article is located. These lines project upwards and away from the operator at about 45 degrees and require a distance of travel before they can reach a certain height on the side of the article. An NCR scanner is also capable of reading symbols on the top of the scanned article.

In conventional systems, an operator visually locates the symbol as he or she moves the article towards the scanner. The system can read the code only if it is located in such a position so that it passes through the field of view of one of the scan heads in one of the windows. If the symbol is not located in such a position, the operator must re-orient the product and pass it over the scanner. In practice, if the operator cannot visually locate the symbol, he assumes that it may be on the side of the article that is facing downward or on the side of the article facing the vertical scanning window. The operator has to decide if he wants to risk moving it through the scanning system without locating the symbol, hoping that the system will find the symbol. The operator will not be certain that his hand is not covering the symbol. If the operator decides to make an attempt at scanning without locating the symbol and the scan attempt fails to locate or read a symbol, the operator will have to move the article back and try again, this time locating the symbol visually to assure success. This is time consuming, and therefore, is an inefficient process. Many operators will avoid such a scenario by visually locating the symbol and repositioning the article, if necessary, before moving the article through the scanning system. This usually assures a reading on the first attempt but the process requires a certain amount of time which reduces the efficiency of the scanning operation. Moreover, in order to visually locate the symbol, the article must be turned so the symbol is pointed towards the operator. The vertical window of conventional two window scanners, however, is positioned to read symbols on the side of the article facing away from an operator. Thus, operators must rotate the product towards themselves to locate the symbol, and then re-orient the package towards either the horizontal or vertical window.

It has been proposed to configure optical code reading systems with more than two aiming axes or fields of view in order to achieve more reliable or complete scanning. Examples of systems utilizing a plurality of scan modules oriented with their respective lines of sight aiming in different directions, so as to nominally scan two or more optimal planes within a scanning volume are illustrated in U.S. Pat. No. 5,495,097, assigned to Symbol Technologies, Inc. Two systems disclosed in the aforementioned patent are illustrated in FIGS. 1 and 2. Elements 10 in the Figures are scan modules or heads. The system of FIG. 1 includes a conveyor 12 which moves code bearing articles past the scanning heads. The system is an example of what is generally referred to as a "tunnel scanner". The system of FIG. 2 employs a counter 14 on which code bearing objects are supported or moved. This system is referred to as an "inverted tunnel scanner".

While such systems theoretically provide improved optical code reading capabilities over conventional systems, there is a need to develop code reading systems with multiple fields of view which can more accurately, reliably and inexpensively read optical codes which are essentially randomly oriented with respect to the system and the operator.

Many conventional scanning systems are used in conjunction with a point of sale installation or check-out counter. In many cases a single or double window slot scanner or a single handheld scanner or imager module is used in the code reading process. Some audible and visual indicators are provided at the installation such as the familiar beep and price displays. Weighing stations are sometimes also provided. In general, these code reading systems are often add-on items and not well integrated with other structures and functions at the installation.

Accordingly, it is an object of the present invention to provide an integrated, multi-function point of sale or check-out system for reading optical code.

It is another object of the present invention to provide more accessible and useful audible information concerning the code reading process to the operator and/or customer.

When a bar code scanner successfully reads a bar code it creates an audible resonance ("beep"), that provides acknowledgment to the user that the code has been effectively decoded. When the scanner is used in an environment subject to varying levels of ambient noise, the volume of the "beep" often becomes either too high or too low because it maintains only one level. Specifically, the low volume tone creates more of a problem for the user since they can not audibly determine if the code was effectively read. Conventionally, the only way to adjust the volume of the "beep" is to manually adjust the scanner. Depending on the scanner, adjustment is either inaccessible to the user or cumbersome to perform.

It is a further object of the present invention to provide an audible signaling system adaptable to different needs and functions encountered in integrated, multi-function point of sale or check-out systems for reading optical code.

It is a further object of the present invention to provide optical code reading systems with a readily implemented, versatile audio signaling system.

These and other objects and features will be apparent from this written disclosure and accompanying drawings.

SUMMARY

The present invention relates to an apparatus useful in reading optical code symbols. The audible signaling techniques of the present invention are adapted for integration into various types of optical code reading systems which will first be described.

In an exemplary embodiment, an optical code reading system may comprise at least one optical scanning module located in a fixed position with respect to a scanning volume of the system and a movable optical scanning module capable of handheld operation and aiming. The movable module is selectively held by a holding member in a position which enables the module to read optical codes in the scanning volume which cannot be read by the fixed position optical scanning module.

In an alternative embodiment, an optical scanning station with an operator is disclosed for reading optical code symbols on target objects. The station may comprise a horizontal surface with at least one optical scanning module located underneath. The module underneath reads optical code on at least the underside of target objects through a window located at the horizontal surface. A raised housing portion on a side of the horizontal surface which is closest to the operator may contain at least one optical scanning module for reading optical codes on the target objects which cannot be read by the module located underneath the horizontal surface.

In other embodiments, an integrated point of sale or checkout system is employed. The checkout system may comprise a conveyer at a predetermined height for horizontally transporting a plurality of objects. At least some of these objects may bear an optical code symbol. Code reading modules may be located downstream of the conveyer. The code reading system may comprise a scanning module located under a window in the horizontal surface. This surface may be at the same height as the conveyer. A hood or arched portion of the system housing may form a tunnel over the horizontal surface which supports optical code bearing articles.

An audio signal system is used in conjunction with these various code reading systems. In preferred embodiments, the system includes an audible indicator in a system housing located within ear-shot of a system operator. The system may include a sound detector such as a microphone for detecting ambient sound level in the vicinity of the operator and control circuitry for controlling the volume of the audible indicator in response to the detected ambient sound level. A level setting control may be employed to manually adjust the sound volume produced by the audible indicator in response to the ambient sound levels.

The audible indicator is produced in response to the occurrence of an optical code reading function. In one embodiment, an audible signal is produced in response to the occurrence of a successful reading of an optical code. Alternatively or in addition, the audible signal may be used to indicate the detection of the presence of a particular optical code symbology, for example, the presence of PDF code. Different signals may be used to differentiate the detection of different code types, for example, a lower frequency signal for a one dimensional symbol and a higher frequency signal for a two-dimensional symbol.

In other embodiments an audible signal generator is employed to produce a variety of different and audible tones and waveforms, in response to different events at the code reading station. In a preferred embodiment, a sound synthesizer produces preselected sound in response to information decoded from a detected optical code, such as product identity information.

The scope of the present invention is defined in the claims.

BRIEF DESCRIPTION OF THE DRAWINGS

FIGS. 3(a) and (b) illustrate general concepts involving the use of plural scanner heads to provide multiple fields of view in relation to a scanning volume;

FIG. 4 illustrates an arrangement of scan heads or imaging engines in accordance with a preferred embodiment of the present invention;

FIG. 5 is a pictorial schematic view of a code reading system with multiple fields of view using a docked, handheld code reader, in accordance with a preferred embodiment of the present invention;

FIGS. 6(a) and (b) illustrate use of a handheld device such as a personal computing device, equipped with a scanning head or imager, in practicing the teachings of the present invention;

FIGS. 7(a), 7(b) and 8 illustrate the use of mirrors in preferred embodiments of the present invention;

DETAILED DESCRIPTION

OUTLINE

Figure 1:
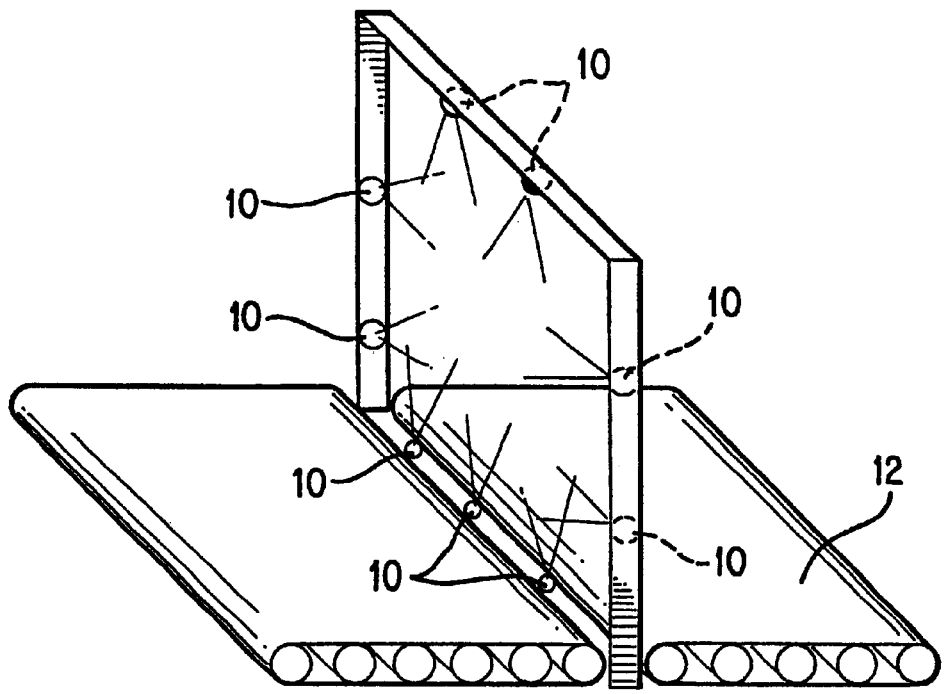
FIGS. 1, and 2 are examples of prior art tunnel and inverted tunnel scanners.
Figure 2:
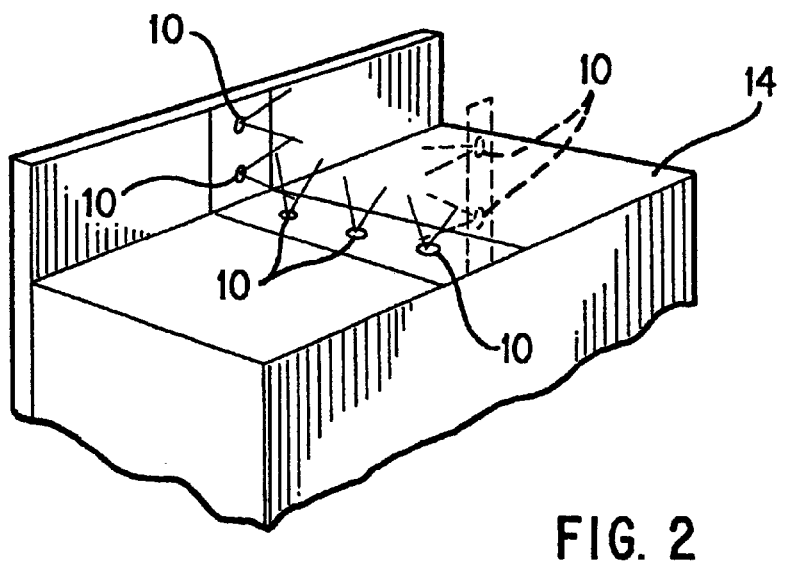

I. Code Readers With Multiple Fields of View.
II. Implementations Employing Multiple Laser Scanner Modules or Imager Modules, Mirrors and Handheld Code Readers.
III. Modular Construction: Electronic Integration of Multiple Scanner Modules or Imager Modules.
IV. Ergometric Designs for Point of Sale Code Reader Systems With Multiple Fields of View.
V. Code Reader Systems Including Side Rail-Located Code Readers or Windows.
VI. Two Component Focusing.
VII. Audible Signals for Code Readers.
VIII. Integrated Weighing Systems.

I. Code Readers with Multiple Fields of View

FIGS. 3(a) and 3(b) illustrate the deployment of multiple scan modules or imager modules and corresponding scanning or imaging volumes.

Typically, omni-directional multi-planar scanning systems have restricted decode zones in a three dimensional field through which an optical code passes for decoding. An example of multi-planar scanning systems are illustrated in FIGS. 3(a) and (b). These scanning systems utilize a plurality of Omni-directional Scan Modules (OSMs), designated 110, 120, and 130. Scan lines, designated 115, 125 and 135, emanating from sources such as a spinning polygon, are directed toward a three dimensional scanning volume where scanning is performed. However, in order to decode bar codes omni-directionally in the scanning space while maintaining the required scan line density per plane, a relatively large number of scan lines are needed. This can be achieved by increasing both the number of scan line generating facets of the polygon and the number of fixed position mirrors off which the scan lines are deflected. The system will become substantially larger and more expensive if the signal quality is to be maintained.

One approach for minimizing the size and cost of a code reading system with fields of view and capability of reading codes on an arbitrarily oriented surface in the scanning volume is to minimize the number of OSMs. Returning to FIGS. 3(a) and 3(b), two possible minimal configurations that cover a decode sphere within the volume 150 are illustrated. However, the degree of coverage, or the size of this sphere will depend on the yaw, pitch, roll and range abilities of each OSM. Such a deployment may not be ergonomically feasible in, for example, the Point of Sale (POS) environment. Therefore, these potentially minimum configurations are not practical for most situations.

What is needed, therefore, is a method for increasing the number of omni-directional scanning or imaging planes while maintaining or even increasing the scan line density per plane. From an economic point of view, it is desirable to achieve this without substantially increasing the size or cost of the system.

Preferred embodiments of the present invention permit a modularized deployment of scan modules or imager modules deployed within the ergonomic constraints of a POS installation. The result is an acceptable trade-off for cost and coverage. The manufacturer or customer can decide on the location and number of scan modules or imager modules of a system based on individual needs and criteria.

Figure 12A:
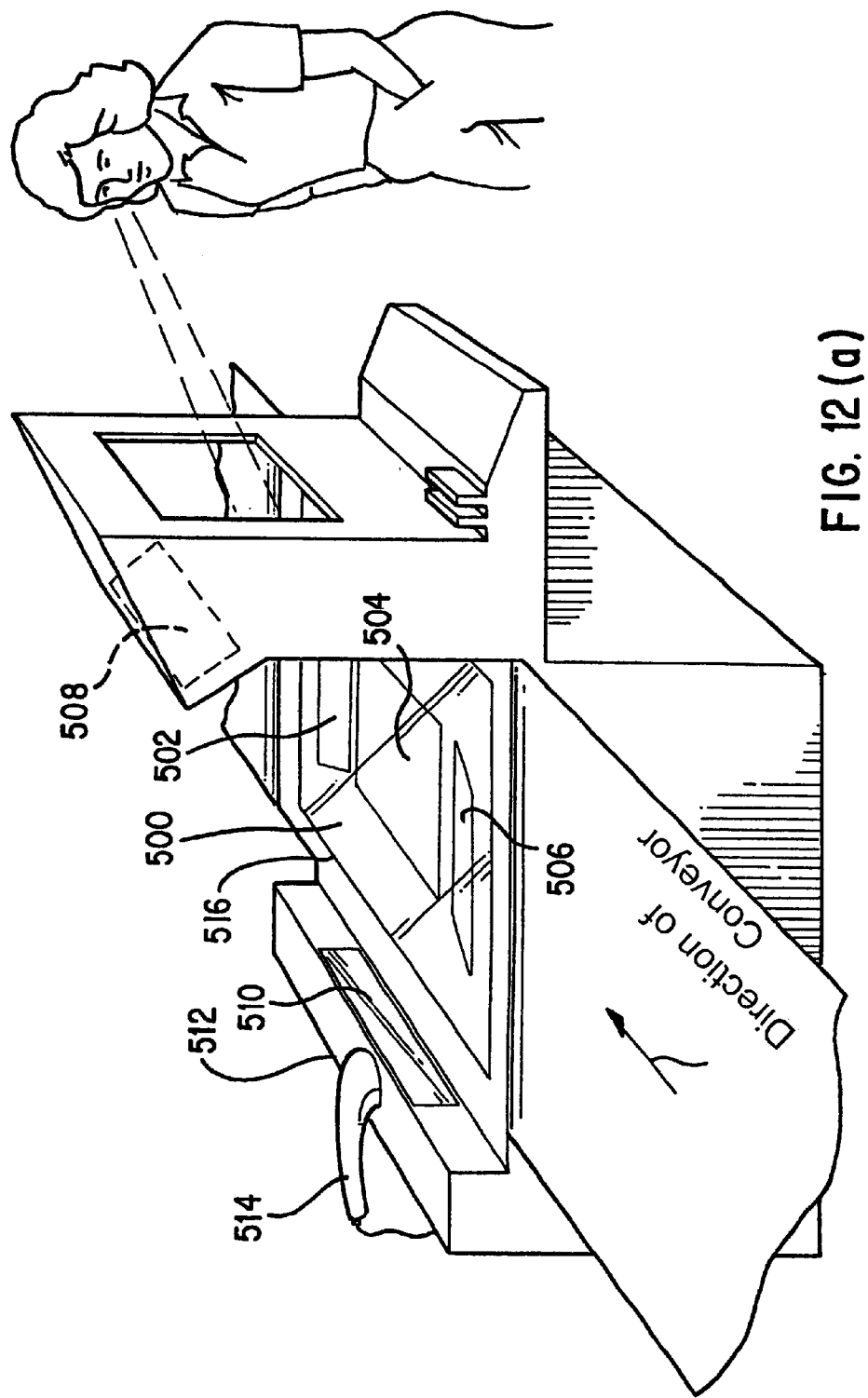
FIGS. 12(a) and 12(b) are pictorial views of an alternative embodiment of a point of sale installation in accordance with preferred embodiments of the present invention.

FIG. 4(c) illustrates an advantageous arrangement that provides a substantially complete three-dimensional spatial coverage. Each OSM may have a dense rotating Lissajous scanning pattern that provides a complete omni-directional coverage within the field that it is projected onto. The prescribed yaw and pitch performance of each system will affect the degree of coverage per The coverage for each scan modules or imager module of FIG. 4 in a POS environment is given in Table 1 below. A POS system embodiment, showing the locations of the components is shown in FIG. 12(a).

| OSM | Optical Code Location Covered* | Location of OSM |
| --- | --- | --- |
| 160 | Top and partial back of article | Under arch |
| 165 | Leading side and partial downward facing side of article | Angled under the horizontal scanning window 185 |
| 170 | Downward facing side of article | Under the horizontal scanning window 185 |
| 175 | Trailing side and partial downward facing side of article | Angled under the horizontal scanning window 185 |
| 180 | Back of object (field of view directed out of the plane of FIG. 4) | Angled under the horizontal scanning window 185 or inside upright support on customer side |

*Location in reference to an operator

OSMs 165 and 170 or OSMs 170 and 175 are arranged in a manner that may also use additional mirrors to project a pattern in much the same manner as conventional slot scanners.

The modular concept permits a tradeoff cost for performance or planar coverage. For example, in some use environments, two scan modules (a bi-planar implementation) with higher scan pattern density per plane will provide ample coverage. If more is required, the manufacturer will simply supply an additional scan modules or imager modules engines as discussed in section III below.

II. Implementations Employing Multiple Scan Modules or Imager Modules, Mirrors and Handheld Code Readers In order to obtain the desired multiple fields of views and system flexibility while minimizing hardware costs, preferred embodiments of the present invention employ multiple function handheld code readers and/or mirrors. In one embodiment a handheld unit can be employed as a substitute for a fixed position OSM. In this case, the handheld unit may be a complete unit in the sense of containing its own decoding circuitry, or the unit may simply be a laser scan module or imager module, which provides a data stream to centralized processing circuitry.

A simplified example of such use of a handheld unit is shown in FIG. 5. The system coverage of the apparatus of FIG. 5 is similar to that of FIG. 3(b). However, one of the OSMs 130 of FIG. 3(b) is replaced by a handheld scanner 200, releasably held in a fixed position, with its optical axis 202 aimed toward the scanning volume or target object 204. As shown in FIG. 5, the means for holding the handheld scanner may be a docking cavity 206, adapted to receive the handle of the handheld code reader. This implementation enables the user to have access to a handheld, manually aimable handheld unit, which doubles as a fixed position code reader. The handheld unit 200 may contain a conventional laser scan module 208. Alternatively, in environments where image blur and aiming are not a problem, an imager module may be employed, particularly a sophisticated type capable of reading various types of one and two dimensional codes such as postal code, PDF417 code, MaxiCode, etc. Such a handheld unit may use the imaging engine described in U.S. patent application Ser. No. 09/096,578 entitled "Imaging Engine And Method For Code Readers", which is hereby incorporated by reference. In either embodiment, the handheld unit may contain its own decoding circuitry.

An additional benefit of the disclosed system is that each reading module can be optimally aimed and focused for the best performance in its designated working distance. Where a laser scan module is used, the scan pattern can also be optimized for best performance in its scanning plane. In the case of the handheld unit, a focus switching mechanism such as a movable lens or aperture, can be utilized to optimize the performance of the detachable unit for handheld use as well as the "docked" mode. A bizoom lens system for an imager module is disclosed in the above-referenced copending patent application.

In further exemplary embodiments, a portable, handheld computing device such as a PALM PILOT, equipped with an optical code reader may be used as the heart of a small stand-alone cash register for a small store or as one of a number of code readers connected to a host terminal and/or a central computer in a large store. The portable device may also be used as a handheld scanner whenever the item to be scanned cannot be placed in the path of the scan beams either due to the size or weight of the product. The portable device may also be used to check store inventory or scan newly received items at the receiving dock. Information pertaining to newly added items may be added to the price file by scanning the information or by entering it manually using the portable devices pen or touch pad input capability. Such a device may also be used, for example, as both a fixed mounted or handheld code reader for inventory-control or tracking such as in a factory, shipping facility, library or blood bank.

FIGS. 6(a) and (b) illustrate a PALM PILOT computing device 210 equipped with an optical code reader 212. A window of the code reader is located at 214. The numeral 216 identifies an emitted laser scanning pattern or a field of view of the code reader. The computing device 210 may be docked or affixed to a stand 218. When in its fixed mode as shown in FIG. 6(b), the device is capable of reading codes in a manner similar to a fixed OSM in a POS installation. The device is also capable of functioning as a handheld code reader.

The window of the code reader may be connected to the top of the PALM PILOT. Accordingly, the PALM PILOT may be configured to display data in an inverted mode as shown in FIG. 6(a) where the device is used as a handheld code reader. When placed on the stand 218 as in FIG. 6(b), the system may revert to its normal display mode when the field of view points generally downwardly.

The PALM PILOT device may be connected to a cash drawer, a credit card swipe reader, a smart card reader, a modem, a host computer or a receipt printer using a cable 220. The PALM PILOT device may also contain a price file or other similar application specific software or data. The power to the portable device may also be supplied from the cable 220 or alternatively provided with power through a socket when the device is docked. When undocked, the device may be operated on internal battery power. It is efficacious for the Pilot to recognize whether it is in a stand or out of a stand. As described above, if it is placed in a stand, the orientation of the display has to be inverted. There is no need for power conservation if the unit is placed in a stand connected to a power source; there is, however, a need for minimizing power consumption if the unit is operating with a battery. Several techniques may be used to sense docking of the device. In one technique, a magnet in the stand may be used to trigger an internal Hall effect sensor or reed switch in the detachable device. The detachable device can also detect a stand optically by detecting light reflected back to an optical sensor in the device by the stand. The device can further detect a stand when detecting the application of electric power or voltage which occurs when the device engages electrical contacts on the stand, or by sensing contact with the connector.

Mirrors may be employed to obtain more fields of view or aiming directions, particularly in systems with multiple fixed scan modules and a handheld code reader.

FIGS. 7(a) and (b) illustrate two examples of implementations involving a handheld code reader 230. In these systems, the handheld code reader 230 may be docked or otherwise positioned so that its field of view includes a mirror 232 or 232' located in a POS installation or code reading station. In FIG. 7(a) the operator positions the code reader in the side of the station 234 so that the field of view 236 projects upward through a horizontal window 238. An alternative embodiment is shown in FIG. 7(b) where the code reader 230 is pointed or docked downwardly into a side rail 240 near the operator. The field of view is deflected by the mirror 232' and projects generally horizontally through a generally vertical side window 242 of the system. It will be understood that other arrangements of the scanner dock, mirrors and windows may be employed to obtain various fields of view toward a scanning volume in various directions with a handheld code reader.

FIG. 8 illustrates another use of mirrors in order to produce multiple fields of view with a minimum number of scan modules or imager modules. The system includes a removable cordless handheld code reader 250, with a field of view 252 (when docked in the system) which covers the front of the scanning volume or a target object 254 therein. The handheld unit may be capable of recognizing and decoding many different types of code.

Laser beam scanners 256, 258 and 260 may also be provided. Advantageously, these devices may be single line or omni-directional scan modules. In another embodiment, the handheld unit is based on an imaging engine as described above. When the handheld unit is removed from its dock 262, the other scanners may be turned off. Alternatively, the laser scan heads may be alternatively turned on and off. In another alternative embodiment, the laser scan wavelengths may be different from scan module to scan module, and a system of band pass filters may be employed.

Mirrors 264 and 266 located above the scanning volume, may be used to provide a tunnel scanner with fields of view which cover the scanning volume. It will be understood that scan modules 256 and 258 must have a large depth of field or selectable depths of field in order to read code directly or to read code reflected by the mirrors 264 and 266.

In a preferred embodiment of the present invention, a two-window point of sale scanner is implemented using two scanning motors and two polygonal scanning mirrors. In such a case, each scan module has its own motor and polygonal mirror. Although this is a somewhat expensive configuration compared to all the single motor/polygon systems shown in the prior art, two motor/polygons in a Bi-optic scanner can provide increased scanning performance.

Single motor/polygon Bi-optic scanners need to position the polygon where it can be used to project scan lines out both windows. This position is not optimum for both (or either) window. The use of two motor/polygons allow the designer the freedom to place one in an optimum position for each window. This enables the projection of the best possible scan pattern from each window.

For example, a three-sided polygon may be best for the horizontal window, and a four-sided polygon may be best for the vertical window. The tilt of the faces on each polygon may need to be different to spread the scan lines apart a different amount as required for the best scan pattern for each system. The two motors may be positioned with different orientation of their axes of rotation. The motor driving the polygon that creates the scan pattern that scans out the vertical window may best be oriented with a horizontal axis. The other motor may be best if oriented vertically. It may be advantageous to run the two motors at different speeds to equalize the spot speeds generated by the two polygons.

It is also possible to position each polygon so that it projects out both windows, providing more scan lines and/or higher pattern repetition rate than can be created with one motor/polygon.

It will be understood that the use of two motor/two polygons provides many degrees of freedom to the scanner designer that are not available in single motor/polygon designs.

The two polygons can scan laser beams produced either by two individual lasers, or the beam of a single laser can be split with a beam splitter allowing the two polygons to scan beams originating from a single laser. If desired, each polygon can scan more than one beam. Each beam can be produced by a separate laser or beam splitters can be used. Conventional bi-optic scanners are capable of scanning symbols on four or five sides of a package. The use of two motors and two polygons provide improved scan pattern coverage.

III. Modular Construction: Electronic Integration of Multiple Laser Scanner Modules or Imager Modules In preferred embodiments of the present invention, a POS installation or code reading terminal is provided with plural module stations, each having electrical couplings and mounting structure adapted for receiving a scan module or imager module. These features permit customization or upgrading of the installation or terminal. The installation or terminal may further include circuitry or software for automatically detecting and configuring by the system. The detection mechanism can be implemented by mechanical switches, electro-magnetic switches, or software protocol where each modules identifies itself to the system upon power-up.

Figure 9:
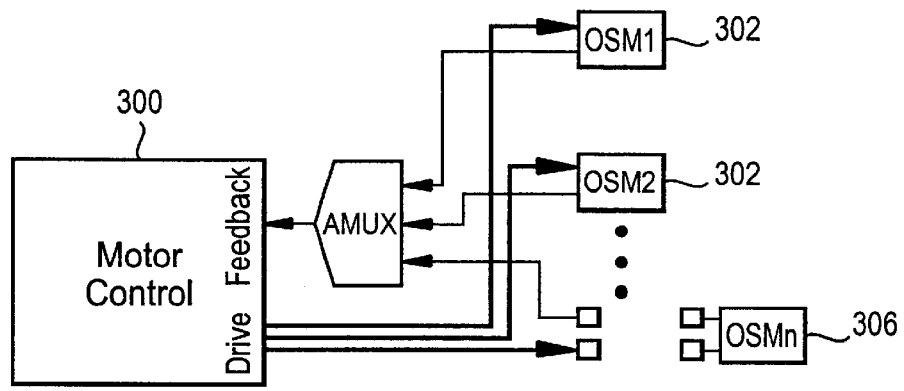
FIGS. 9 and 10 are schematic block diagrams of electronic systems for integrating multiple imaging or scanning modules in accordance with preferred embodiments of the present invention.

In order to obtain efficiency, in terms of lowering costs, each scan module (e.g. OSM) or imager modules may consist only of optical elements and signal receiving and digitizing electronics. The remaining control system "backbone" may consist of the motor control and decoding sub-systems. In a preferred embodiment, the motor control electronics generate different "optimum" patterns for different OSMs depending on the plane that is to be scanned. This feature adds negligible cost to the motor control system since all of the flexibility will be achieved via adaptive software controls. As depicted in FIG. 9, the motor control unit 300 may fan out the control signals for each scan module 302.

The feedback signal is used to monitor and update the scan pattern variations with temperature or other perturbations. The signal may be multiplexed back into the motor control unit 300. Once the software functions for generating the basic scan pattern are established, generating variations for each OSM separately will cost little extra processing power and will require little or no additional electronics. When a new OSM 306 is added to the system, its location will be relayed to the motor control so that the appropriate scan pattern can be generated.

Multiple streams of digital bar patterns (DBPs) may be produced by the various laser scan modules or imager modules.

In a preferred embodiment, a hardware circuit for each module filters data to output data identified as candidate optical code or fragments thereof. Data output by the filter is presented to a central decoder in the order it arrives. As soon as a decode occurs, regardless of which scanner it came from, the system will provide an indication of decode (e.g. a "beep") and the decoded data will be transmitted.

Alternatively, the system must prioritize the stream to which the decoding algorithm is to be applied. This implies that it must quickly determine the stream that is most likely to have bar code data before attempting to decode it. This should be done at a computation speed such that the system can keep up with the data rate.

Before attempting to decode any bar code, its symbology type is first identified. For imager modules it can be implemented in the manner described in patent application Ser. No. 09/096,578 referenced above. For OSMs, this portion of the algorithm is relatively small compared to the rest of the decoding algorithm. For OSMs, it can be implemented in hardware at a relatively low cost for achieving a very fast identification. Each stream of DBP data can then be captured in a finite size buffer and funneled through the bar code identifier hardware.

Figure 10:
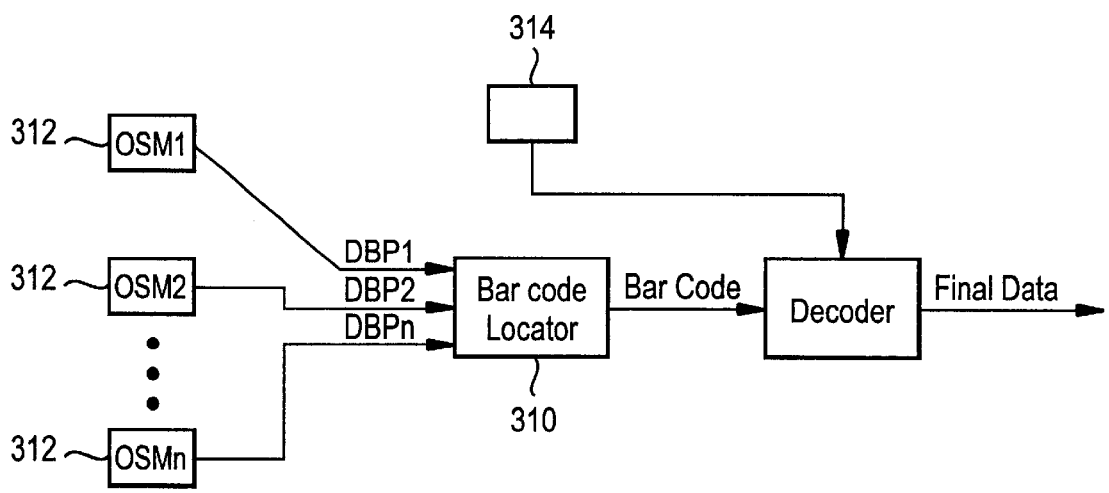

As shown in FIG. 10, a bar code locator 310 receives DBP signals from the various OSMs 312. This logic block will determine which stream contains a valid bar code and then direct the stream to the decoder while identifying its symbology type in the process. This concept is depicted in FIG. 10. It can also be accomplished via a conventional IC filter to identify a signal having a potential or likelihood of being an optical code. The tradeoff between implementing the bar code finder block as hardware or software will depend on the system speed, cost, and time that is available to get it to the market. Another approach is to coalesce pieces of the bar code from different scan sources as described in U.S. Pat. No. 5,495,097, the contents of which are incorporated by reference.

In the case of an imaging engine 314, such engine may implement autodiscrimination algorithms described in the above-mentioned patent application to identify the presence and code type in the image. Alternatively, the imaging engine is a free standing unit with its own decoder.

This implementation of a multi-planar scanner using OSMs will have the cost advantage of using a single motor control and decoder for all the units. The cost per added plane or field of scanning will primarily be the cost of adding an OSM without a decoder and motor control.

Figure 11:
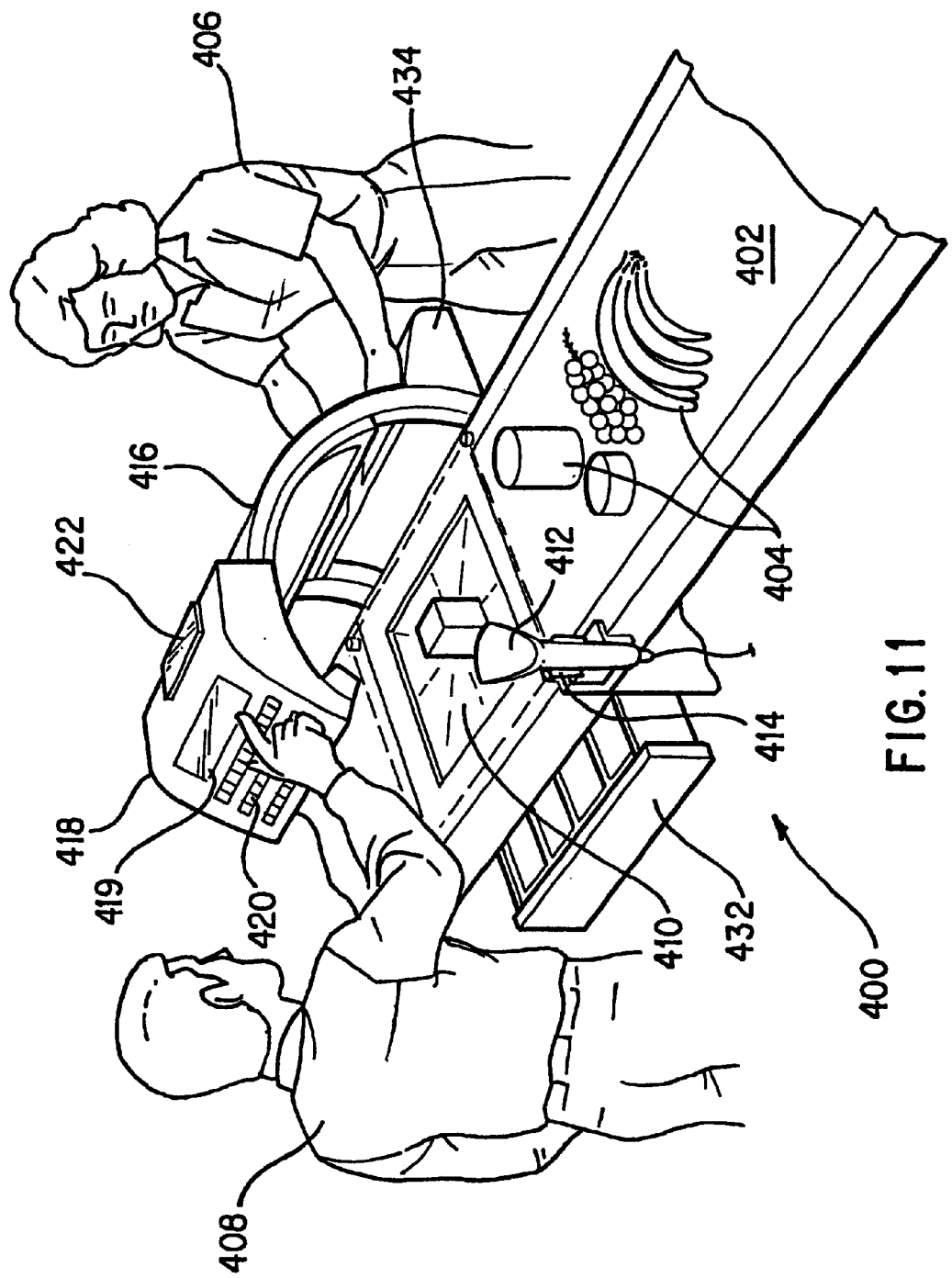
FIG. 11 is a pictorial view of a point of sale illustration including a code reading system with multiple fields of view illustrating various aspects of the present intention.
Figure 11A:
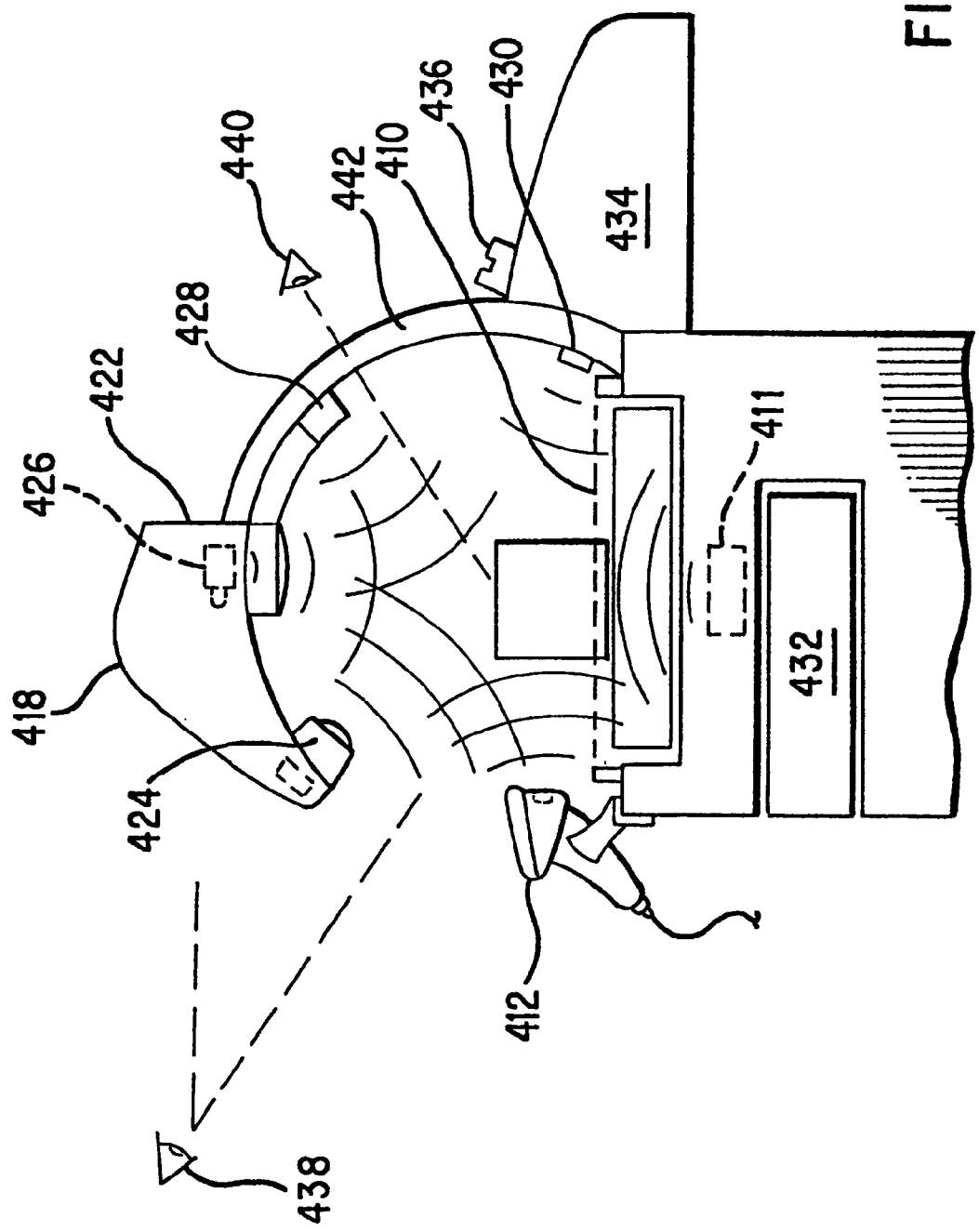
FIG. 11(a) is a side view of the illustration of FIG. 11.

IV. Ergometric Designs for Point of Sale Code Reader Systems with Multiple Fields of View A customer checkout station or POS system 400 configured according to an exemplary embodiment of the present invention is illustrated in FIG. 11. FIG. 11(a) is a side cross-sectional view of the checkout stand of FIG. 11. The customer checkout stand includes a conveying means 402 on which a plurality of articles 404 are transported between a customer 406 and a system operator or checkout clerk 408. The articles are conveyed to or moved by the operator onto a horizontal scanning window 410 where a code symbol affixed to the articles may be scanned by one or more of a plurality of scan modules 411 under the window. For example, a plurality of OSMs may be located beneath the horizontal scanning window 410 as discussed above. A handheld unit 412 may also be provided which can read codes from a fixed dock 414 or which can be detached and used to access codes on articles that are either too large for the conveying means or too heavy. The handheld scanner can be omni-directional without an internal decoder. The scanner may share the slot scanner's decoder. The handheld scanner could be operated by a trigger. A trigger pull could, for example, turn off the laser in the slot scanner, turn on the laser in the handheld scanner and switch the input of the decoder to the handheld unit instead of the slot scanner. Alternatively, the handheld scanner could be set to run continuously. It could be positioned so that, when it is rested in its holder, its scan pattern can supplement the patterns of the slot scanner. Actuation of the handheld scanner may also deactivate the horizontal and vertical windows so as to facilitate scanning by the handheld scanner exclusively as in cases where the produce is not located on the conveying means due to its size or weight. Above the scanning window 410 and attached to the stand at a side away from the operator is a substantially semicircular hood or partial arch 416 that forms a tunnel over the conveying means 402. The hood may include an input/display terminal 418 visible to the operator and at a convenient working height for the operator to observe the display 419 and to input information on a keypad 420. A second display 422 may be used to display information to the customer such as item price, product information, discounts, etc.

The hood or arch may also house optical code readers or modules 424, 426, 428 and 430. These code readers may be located within the hood on the back of the display terminal (424 and 426) in the arch (428) or at the base of the arch 430. Generally, the fields of view of these code readers are directed towards the conveying means to provide a substantially complete coverage of an article as it moves through the checkout stand. The hood may prevent very large objects from passing through a fixed scanning volume of the system. However, such large objects may be scanned by the handheld unit.

The checkout stand 400 may also include a cash drawer 432. The hood may also have attached to it, on the customer side, a check writing stand 434 with a credit card reading device 436 located thereon.

Additional aspects of the present invention will be more apparent from the side cross-sectional view of FIG. 11(a). The Figure illustrates the scanning field of views of the various code readers and modules. The viewpoints of the operator and customer are suggested by the eye symbols 438 and 440, respectively. It will be observed that where the handheld unit 412 is not a laser scanner, that no laser scanners are directed toward the eyes of the operator or customer. In addition, it will be observed that the operator has a clear view of the input/display terminal 418, of the scanning volume and conveyor, and of the handheld unit 412 and cash drawer 432, when open. The customer is provided a clear view of the display 422, the surface of the check writing desk 434, and of the articles in the scanning volume through a window 442 in the arch.

V. Code Reader Systems Including Side Rail-Located Code Readers or Windows

Other embodiments of the present invention incorporating multiple scan modules or imager modules are illustrated in FIGS. 12(a) and (b). The horizontal scanning window 500 may overlie a plurality of OSMs 502, 504 and 506, each projecting laser beams at different angles. One scanning window 508 may be located on the customer side. Another vertical scanning window 510 adjacent to an operator may also be included in side rail 512. This second vertical scanning window 510 may include an OSM. It has been found ergonomically acceptable to have a side rail as much as two inches high next to the operator. Alternatively, the code reading function may be provided as shown in the Figure by a docked handheld unit 514 and the mirror arrangement previously discussed in connection with FIG. 7(b). The window 510 may be smaller in height than typical vertical scanning windows used on the customer side in conventional scanners. This is made possible by locating the window several inches from the near edge 516 of the horizontal window 500. This enables the laser lines projected from the lower side window adequate space to travel upwards so that by the time they are over the horizontal window, they are high enough above the counter top surface to scan symbols that are several inches high on the side of a article that is being transported across the horizontal window 500.

Ergonomic studies have shown that the horizontal window of a slot scanner should be located several inches from the operator so his or her hands can easily pass over it without either reaching too far or having to step back. Horizontal windows in slot scanners are typically positioned with their centers about 8 to 10 inches from the counter top edge closest to the operator. This is an adequate distance for the projected lines of the side window to achieve a sufficient scanning height.

Figure 12B:
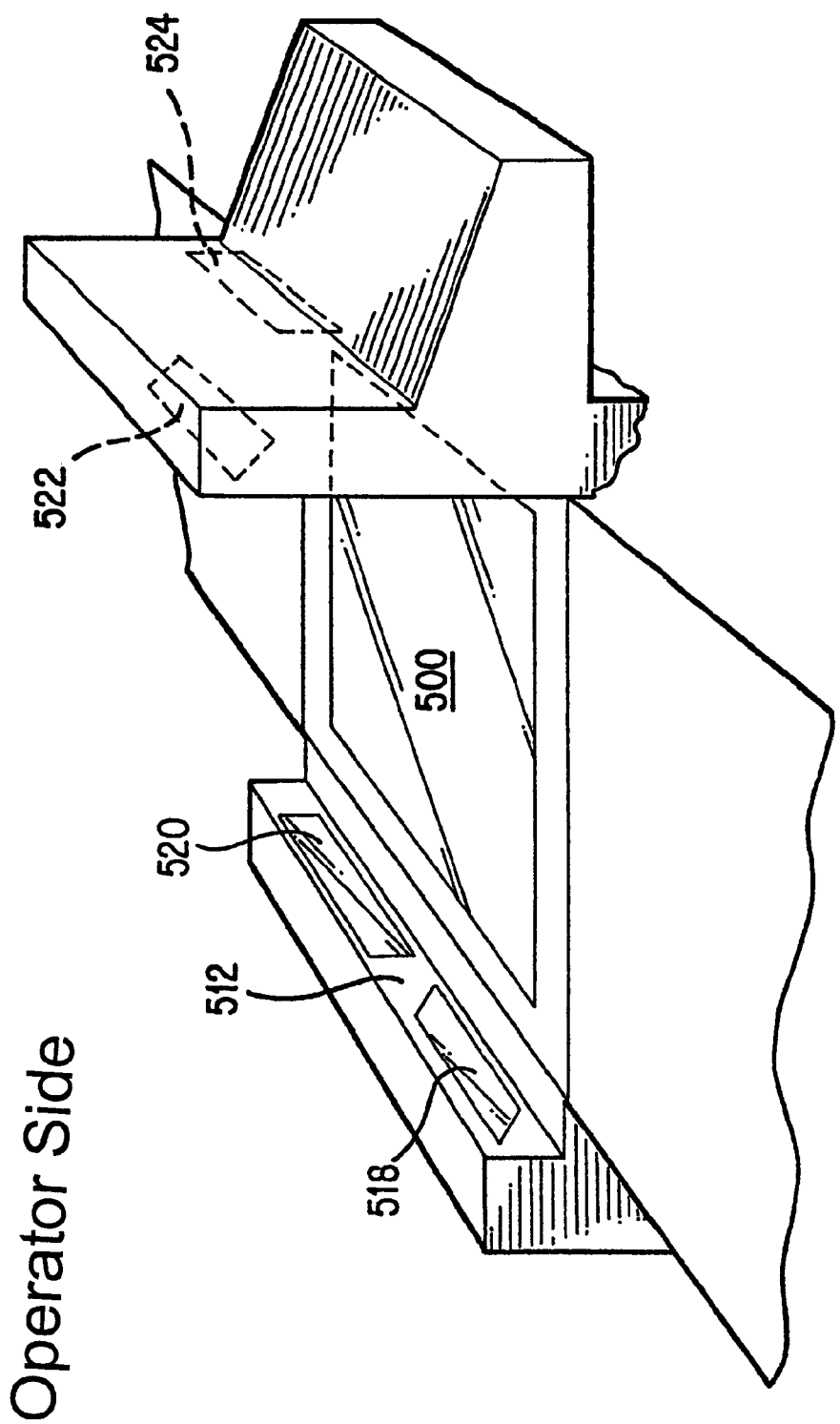

The installation of FIG. 12 may be implemented in several ways. Side scanning can be performed by scan engines independent of the scanning mechanism used under the horizontal window 500. For example, as shown in FIG. 12(b), two OSMs 518 and 520 are positioned close to the operator, having their beams directed across the horizontal window could be used. One OSM module 520 could scan symbols close to the counter top (i.e., lower on the package), the other engine 518 could be aimed at angles inclined with respect to the horizontal surface 500 to scan codes that are higher up.

Laser lines emitted from the horizontal window and from the side window could be generated by a single laser, polygon and several mirrors, much like conventional two window scanners. If desired, far side (i.e., side closest to the customer) reading could be supplemented by two OSMs 522 and 524 mounted at the opposite side of the counter, far from the operator, creating an inverted tunnel code reader.

A conventional two window scanner that scans with a side window in a housing on the customer's side could be upgraded by adding OSMs to scan from the operator side. For less demanding environments, all scanning could be performed by OSMs in a low housing close to the operator, scanning the side of the package facing him. In this case, no horizontal window would be required.

A slot scanner with a small raised portion next to the operator, as opposed to a large raised portion far from the operator has additional advantages.

Articles moving along the conveying means towards a conventional scanner have a tendency to jam against the raised vertical scanning window. As this occurs at a side closer to the customer, it is difficult for the operator to reach in order to clear the jam. With the implementation according to an exemplary embodiment of the present invention, however, the part of the scanner that blocks article flow is much smaller resulting in a reduction of the frequency of jams. If a jam does occur on the other hand, it is easy for the operator to access and clear the jam.

As discussed below, a side rail 512 near the operator is also an ideal location for locating indicator lights, a volume control for a beeper tone or audio signal selector or a display for a weighing scale that is present in checkout stands.

The scan modules in the rail that reads symbols on the side closest to the operator can provide good scanning throughput even when used without an additional scanning window. Throughput can be improved by adding another scanner in the rail opposite the operator to read symbols on the opposite side.

In addition, scan engines in each rail can be aimed upstream and downstream to scan the leading and trailing sides of objects.

Eliminating the modules that scan upwards through a horizontal window enables the conveyor to extend past the rail mounted scanners, eliminating the need for the operator to push every item over the scanner.

Alternatively, rail mounted scanners make it easy to place a scale in the check stand without integrating it into the scanner or placing it under the scanner. Avoiding integrating the scale and scanner makes it possible to provide one model scanner to be used with or without the scale. Avoiding locating the scale under the scanner leaves room for operators to fit their knees under the counter. Finally, elimination of a scanner aimed up through a horizontal window makes room for a cash drawer. Also, a rail containing scan modules can be combined with check writing surfaces, credit card readers, scale displays, cash register displays, and keyboards.

VI. Two-Component Focusing

When creating a bar code scanner, a laser beam has to be focused in order to maximize working ranges for different bar code densities. Typically, focusing is achieved by using a focusing lens and aperture. Three variables have to be optimized: lens focal length, distance between laser and lens, and aperture size. Using only these variables, there are significant limitations. For example, miniature scanners have a small internal optical path and use lenses with small focal lengths. Therefore, there may be a large dead zone at the scanner nose, and there may be significant laser beam pointing error due to laser chip lateral shift. Secondly, 2-D scanners using small lens aperture (round or square) suffers from lack of laser power throughput.

The two-component focusing described below is intended to improve scanner performance without increasing its costs or complexity. It is shown below that the two-component focusing can significantly improve laser power throughput (most critical for long range application), or increase the internal optical path from system exit pupil to scanner nose thereby decreasing dead zone of a scanner (most critical for miniature scanners), or increase system effective focal length to decrease laser beam pointing error (helps to increase collecting area and decrease collecting field of view).

Figure 13A:
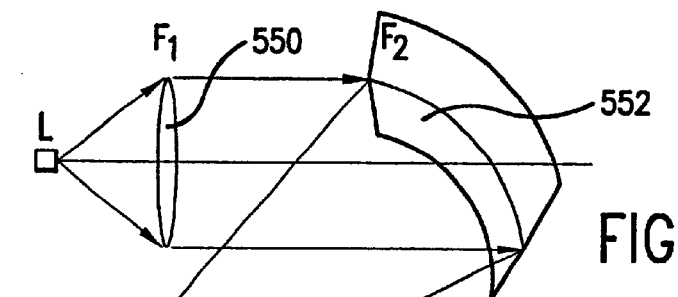
FIGS. 13l(a)–13(g) are schematic diagrams illustrating two component focusing performed in accordance with preferred techniques of the present invention.
Figure 13B:
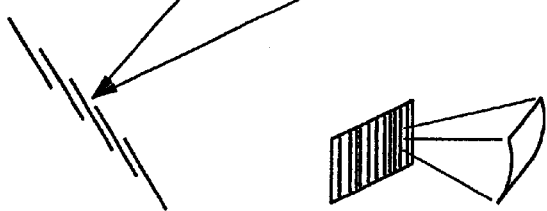

FIG. 13(a) shows an embodiment of focusing techniques using a curved scan mirror. It is known that cylindrical mirrors with curvature in vertical direction (along bar codes) as shown in FIG. 13(b) can improve beam visibility and performance on poor quality symbols. Such mirrors are curved in a horizontal direction in order to provide focusing consistency during scanning.

Figure 13C:
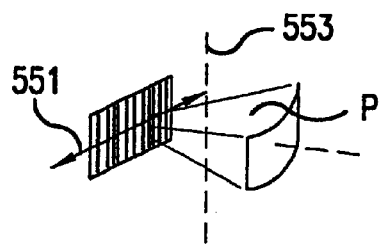

The present techniques may use a mirror with curvature in horizontal plane (parallel to scanning plane) as shown in FIG. 13(c).

Referring to FIG. 13(a), a laser beam from laser L (typically a solid state laser chip) is pre-focused by a conventional lens 550 having focal length $F_1$ and then focused finally by a curved scanning mirror 552 having focal length $F_2$. Mirror 552 is a moving mirror with an optical power. Note that the cost of scan mirror with curved surface is about the same as that for conventional flat mirror when made molding plastic. Focal length $F_2$ can be positive (as shown) or negative depending on desired performance trade-off. Focal length $F_2$ depends on scan angle SA:

$$F_2 = F_{20} * \cos(SA/2),$$

where $F_{20}$ is focal length at the center of scan line. It is a matter of design to ensure that focusing changes during scanning are smaller than focal length of the first element 550 (focusing lens):

$$EFL < F_1.$$

Figure 13D:
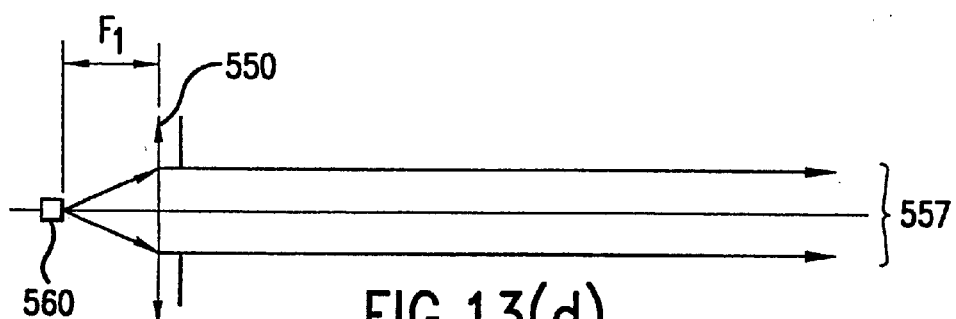
Figure 13E:
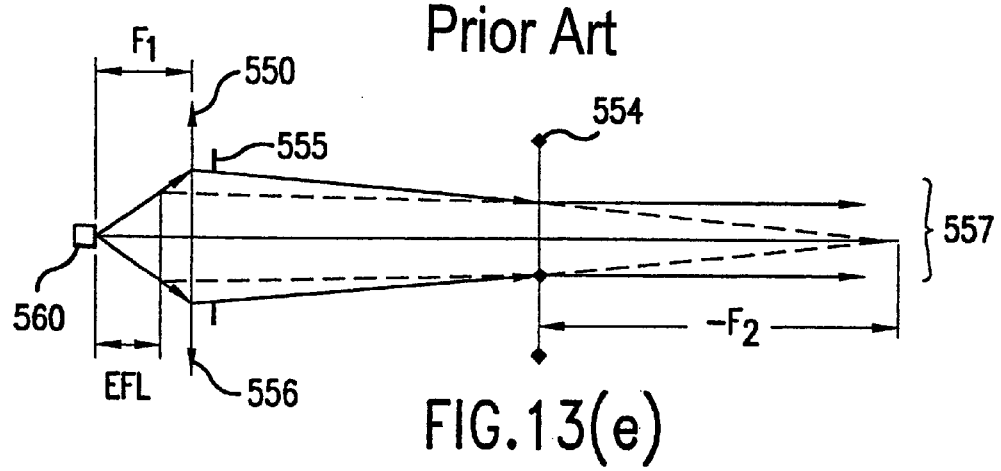

Correspondingly, laser power throughput will be increased relative to the conventional system shown in FIG. 13(d) and having the same beam focusing on the bar code. Note that one could achieve the same result by using a lens with smaller focal length. However, there is an advantage of using curved mirror because one still can use a standard focusing lens providing minimum price of the system. It will be understood from FIGS. 13(d) and 13(e) that the physical separation between the laser chip 560 and the pre-focusing lens 550 is greater in the embodiment of the present invention (FIG. 13e) than in the conventional arrangement (FIG. 13d). This increased separation can be used advantageously in the design of the components. The negative power mirror 554 has the effect of minifying the physical aperture 555. The entrance pupil of the system of FIG. 13(e) is larger than that of the system of FIG. 13(d). However, the actual exit pupil 557 of both systems is essentially identical.

Figure 13F:
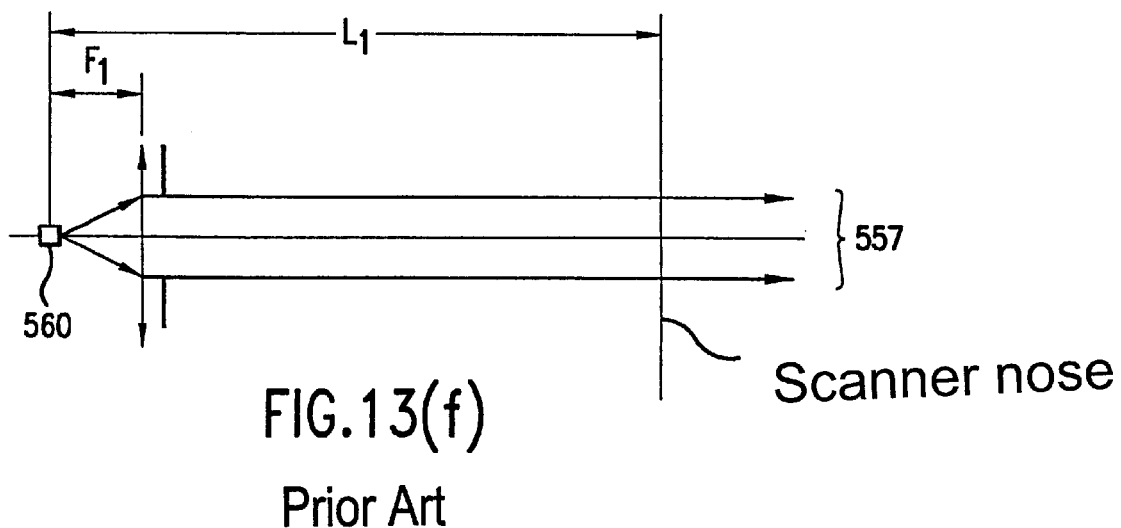
Figure 13G:
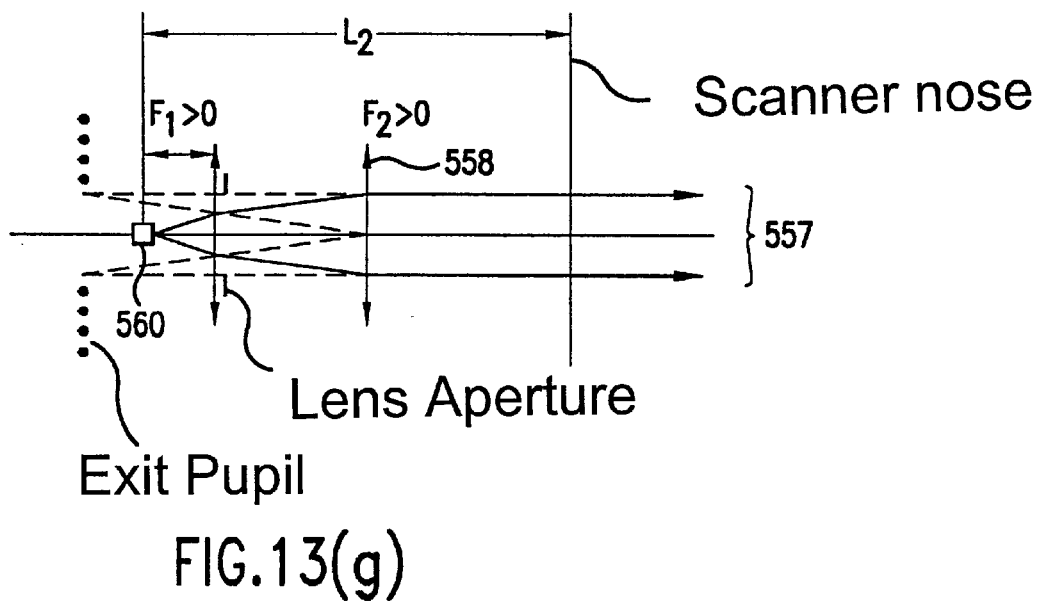

In FIG. 13(g), a convex mirror is represented by equivalent negative lens $F_2 > 0$. The result is that the pupil is shifted significantly back from the scanner nose. Therefore, the system will provide large internal optical path. Therefore, decreased dead zone of scanner working range will be achieved as compared to a conventional system shown at FIG. 13(f) and having significantly larger dimensions. Another advantage of the proposed system is increase of effective focal lens. Therefore, laser beam pointing error due to lateral shift of laser chip 560 will be significantly decreased.

The systems of FIGS. 13(f) and 13(g) have essentially the same exit pupil 557. However, the use of the positive optical power of the second optical component (e.g. curved scan mirror 558) increases the internal optical path. This result is reflected in the reduced physical distance between the laser chip 560 and the scanner nose i.e. $L_1 > L_2$. Consequently, the optical system of FIG. 13(g) is physically shorter in length while providing the same effective internal optical path, working ranges and exit pupil.

VII. Audible Signals for Code Readers

An audible signal (usually a beep) is conventionally used in code reading systems to indicate to the operator that a symbol has been read. Embodiments of the present invention include improved signaling techniques which better communicate information to the operator.

In preferred embodiments, the volume level of the audio signal is adjusted in response to ambient noise level to ensure that it is sufficiently low to be heard by the system operator. The audible signal volume may also be automatically adjusted to take into consideration the ambient noise level which may vary during the day. For example, when the noise level is higher during peak shopping hours, the volume of the signal enunciator may be adjusted upwards. With this implementation, a lower signal volume can be used in contrast to other scanners which have fixed volume signal enunciators mounted under the counters. A lower sound volume reduces the noise level in a store.

In preferred embodiments, multiple audio enunciators (transducers or speakers) with different sound outputs may be integrated into optical code reading or point of sale systems to produce different sound combinations, stereo effects, and/or higher sound volume. Multiple enunciators have the capacity of producing a much higher sound volume at the same frequency. In addition, multiple enunciators can be employed to produce sounds having different phases and/or frequencies to give each station a unique audible signal. These signals may be user defined to give a particular station or scanner a signature which is unique as compared to nearby units. Multiple enunciators can also be used to produce stereo effect with different phases and/or frequencies for different types of optical code (i.e. different signal for a UPC code than for a PDF code). The enunciators may be used to reinforce and direct the signal. The audible signals may also indicate function changes in the reader system (e.g. switching of the code reading mode from one dimensional to PDF or to OMNI modes). Optical codes may be provided to the user which, when scanned, program the audible signal system for providing different sound effects.

Figure 14A:
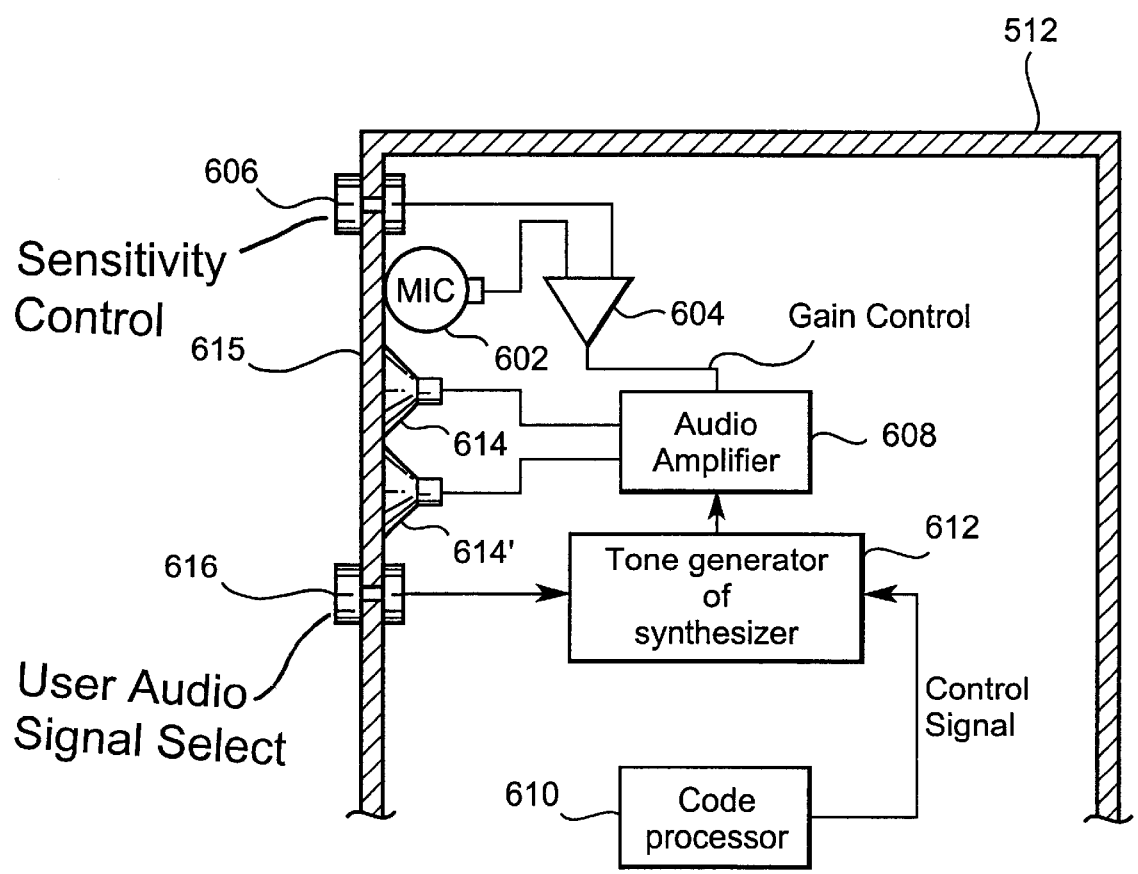
FIGS. 14(a) and 14(b) are respectively a schematic block drawing and flow chart illustrating certain aspects of an audible indicator system of preferred embodiments of the present invention.

An adjustable volume audible signaling system may be implemented as illustrated in FIG. 14(a). A microphone 602 is used to detect ambient noise. A signal from the microphone is compared in a comparator 604 to a preset or threshold value which may be manually set by the operator by adjusting a sensitivity control 606. The output of the comparator determines the gain of an audio amplifier 608. The threshold for each volume setting may be set at a particular decibel level above or below the measured level.

A code processor 610 processes the read code and triggers a tone generator or synthesizer 612 to produce one or more signal waveforms. The waveform is amplified by the amplifier 608 to produce a sound which is emitted by one or more audible enunciators such as speakers 614 and 614'. In an alternative embodiment, the same electromechanical structure may be used on a time-shared basis as both microphone and enunciator.

The speakers may be pointed in a direction to make the signals easily audible to the operator. It is preferable to position the speakers on vertical surfaces or under overhangs so that spilled materials will not foul the speaker. As shown in FIG. 14a the speakers and microphone are located in a housing wall 615 of a raised side rail 512 such as that shown in FIGS. 12(a) and 12(b), located between a horizontal work surface and the system operator.

A beeper with multiple distinct beeps may also be incorporated into the scanning system of the present invention. This type of beeper may be used for scanning two different code symbologies in one trigger pull. The Uniform Code Council (UCC) is preparing a new specification for adding supplementary information, in addition to the uniform product code (UPC), to certain items such as pharmaceuticals. The UPC identifies the product and the new specification enables a second code to represent, for example, a batch number or an expiration date, of pharmaceuticals. Accordingly, two symbologies have to be scanned, with one being a 1D symbol and the second being a 2D symbol appearing immediately above the 1D symbol. The beeper of the present invention may produce one beep to indicate that the 1D symbol has been scanned and a second beep, distinct from the first, to indicate that the 2D symbol has been scanned. In addition, more sophisticated and differentiated sound signals may be provided. For example, the code processor could be configured to select a sound waveform indicative of the nature of the product whose code symbol had been read, for example, an enunciated "moo" or the word "milk" when the product scanned is milk. The audio signal may be manually selected using the selector 616 or controlled by an output control signal from the CPU of the system.

Figure 14B:
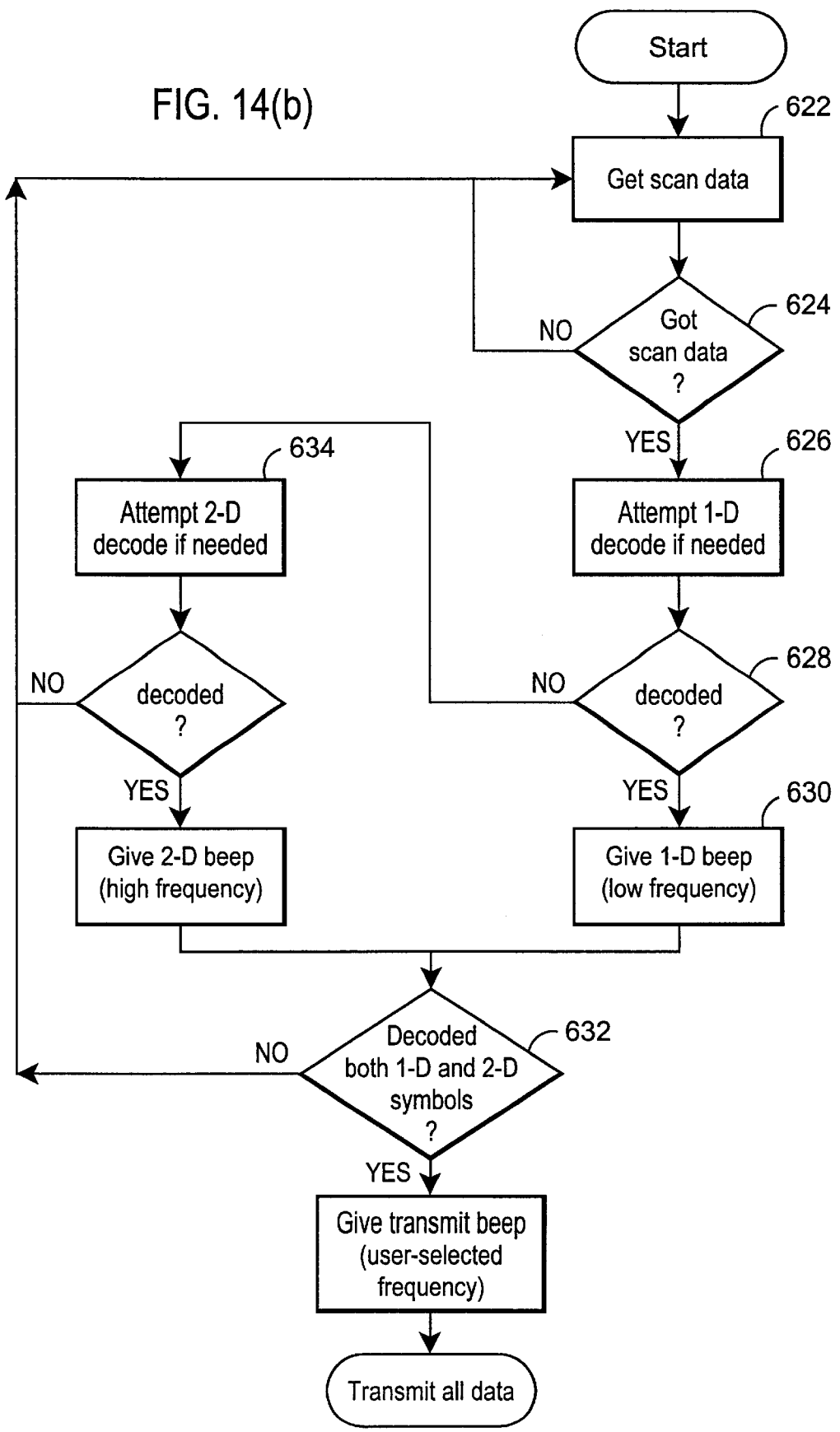

Turning to FIG. 14(b), a process for providing audible signal in response to the detector of multiple bar code symbols proceeds as follows. An attempt is made to locate scan data at 622; if the data is not located at 624, control returns to 622. A decode attempt on a 1D symbol is made at 626. If additional data is not located (i.e., the decode is complete) at 628, control proceeds to 630 which causes a low-frequency beep, indicating the reading of a 1D symbol and control proceeds to 632. If 1D decode fails at 628, a scan attempt of decoding a 2D symbol is made at 634. If both symbols have not been decoded, control returns to 622. A successful scan of the 2D symbol causes a high-frequency beep, indicating the reading of a 2D symbol and control proceeds to 632. A determination is made at 632 as to whether both the 1D and 2D symbols have been decoded. If the result is failure to decode both symbols, control returns to 622. If both symbols have been decoded, a third type of beep, of a user-selected frequency, is emitted and the decoded data is transmitted to a processing system. The decoder, therefore, will beep twice during the decode attempt of a mixed 1D–2D hybrid symbol, such as MicroPDF code above a UPS-A code or code 128 linear symbol.

A scanner that can be used for this purpose is the LS-4804 rastering laser scanner that can read MicroPDF417 and 1D bar codes. An alternative is the imaging apparatus disclosed in U.S. patent application Ser. No. 09/096,578 referenced above. Distinct decode beeps may be emitted as the decoder recognizes and decodes each part of the hybrid. The operator can determine, after the first beep, that one symbol has been decoded and, in addition, the type of symbol that has been decoded so that he or she can concentrate on scanning the symbol that has not been decoded. This approach is more effective if the two symbols of the hybrid are visually distinguishable.

VII. Integrated Weighing Systems

It is known to incorporate single window scanners into a weighing system platen, so that bar code reading and article weighing may be done in an integrated fashion.

It is also known in conventional checkout stands to employ both a bi-optic scanner and a platen for weighing items at the end of a conveyor. This approach has the disadvantage that the products on the platen may lean against a vertical window or housing of the scanner and cause the system to give falsely low readings. It has been proposed to use an "L"-shaped platen for weighing goods in supermarkets. The asserted advantage of such a device is that the platen will contain flexible food items to be weighed within an active scale area and out of contact with scanner components.

Figure 15A:
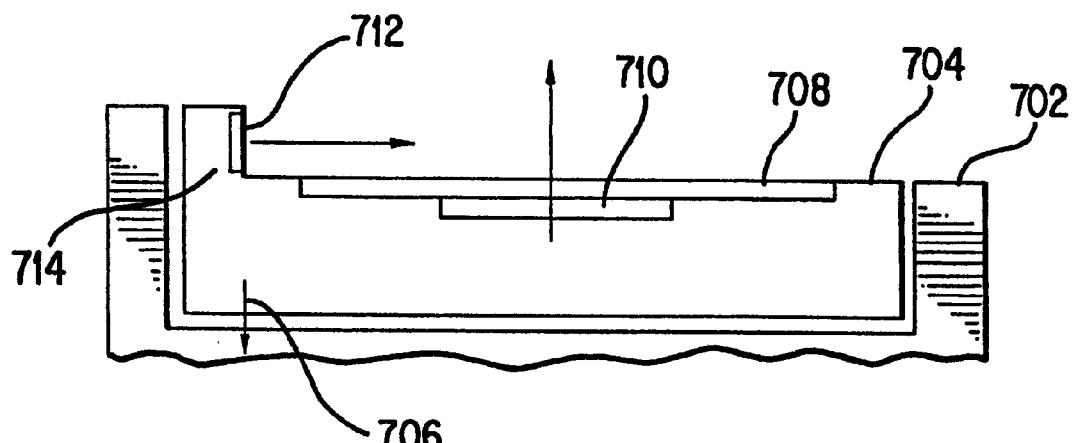
FIGS. 15(a), (b) and (c) are side elevations of an integrated code reading/weighing systems in accordance with preferred embodiments of the present invention.
Figure 15B:
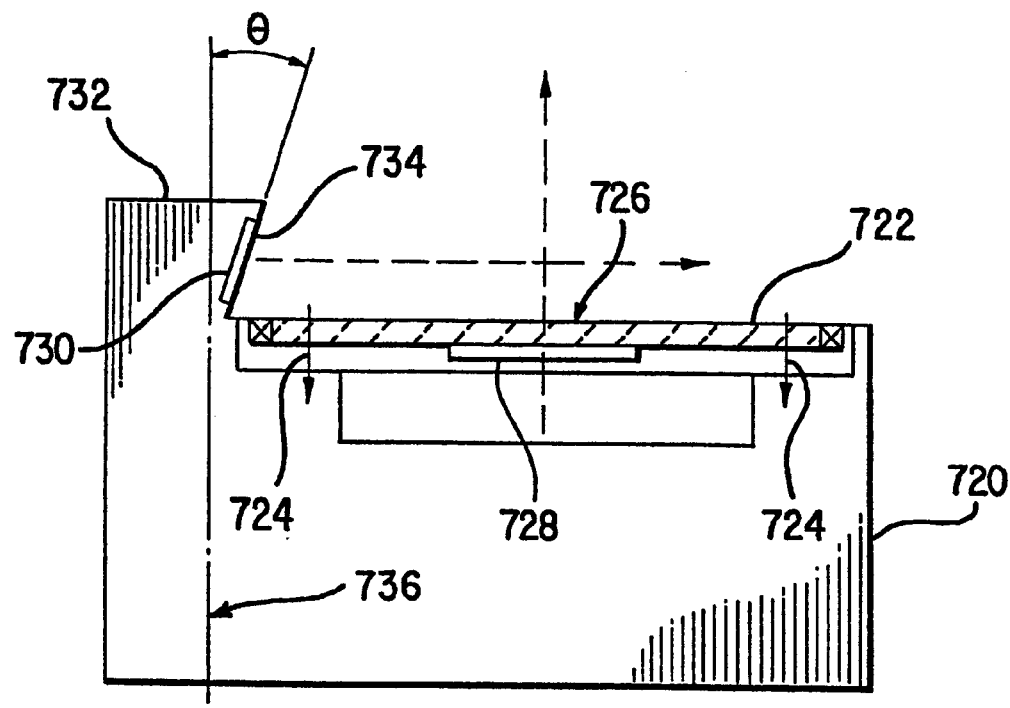

Embodiments of the present invention employ a preferred approach, depicted in FIGS. 15(a) and 15(b), for dealing with these problems.

In the device of FIG. 15(a), the entire scanning system is contained within the moving platform of the scale. More specifically, the checkout stand includes a base member 702 and a scale platform 704 which moves vertically downward relative to the base member as indicated by arrow 706 in response to the weight of objects placed on a horizontal surface 708 of the platform. The platform contains a generally vertically directed scanning head or imaging engine 710 and a generally horizontally directed one 712, located in a side rail portion 714 of the system. Advantageously, the side rail portion may be located on the operator side of the checkout stand as described above. An audible signal may be produced as an indication of the performance of a successful weighing.

In operation, a target object or food item is placed anywhere on the surface 708, and its total mass may be determined in response to the downward motion or deflection of the platform. This construction eliminates concern as to whether the food item is leaning on the scanner housing since the side rail 714 moves with the platform.

Figure 15C:
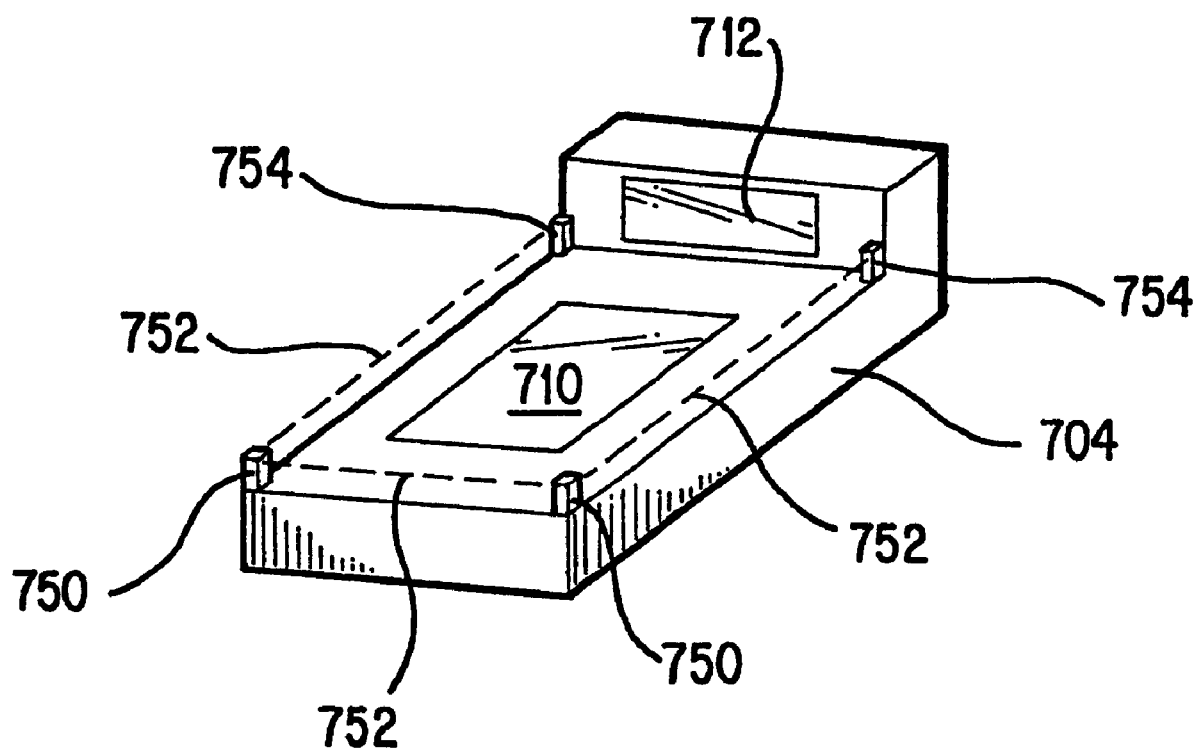

FIG. 15(c) is a pictorial view of the scale platform 704 of FIG. 15(a), illustrating further features of the present invention. The platform includes sources 750 of light such as laser diodes or photo diodes and integrated sensors. Light beams 752 travel between the sources 750 and reflective substrates such as reflective tapes 754 on the vertical portion of the scale platform. An indication is produced when an article interrupts one or more of the beams 752, thereby indicating that the article is not fully located on the scale platform. As such, the system produces a "light-rail" defining the boundaries of the horizontal weighing surface of the scale platform. It will be understood that an indication (such as an audible signal) that an article is straddling the light rail may be used to identify situations where under weighing may result from improper positioning of the article.

In FIG. 15(b), the checkout stand includes a base member 720 and a scale platen 722 which moves vertically downward as indicated by arrows 724 in response to the weight of objects placed on a horizontal surface 726 of the platen. The base member or platen contain a generally vertically directed scanning head or imaging engine 728 and a generally horizontally directed one 730 located in a side rail portion 732 of the base member. The window 734 of the side rail is either vertical or is inclined at an angle θ with respect to the vertical reference line 736, toward the platen. By virtue of this arrangement, objects or food products leaning against the window 734 or side rail 732 do not cause false weight measurements because all the forces from the objects or food products are directed downwardly.

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

What we claim is:

1. An optical code reading system for use by an operator in reading optical code symbols on target objects by providing an audible indication of the results of a reading operation whose volume is automatically adjusted to compensate for a noisy environment in the location of the reading system comprising:

a horizontal surface for supporting target objects;

a housing including a raised portion adjacent a side of the horizontal surface closest to the operator;

at least one optical code reading module in the housing for reading optical code through a generally vertical window in the raised portion of the housing;

an audible indicator located in the housing for indicating an occurrence of an optical code reading function;

a sound detector for detecting an ambient sound level in a vicinity of the operator; and control circuitry for automatically controlling the volume of the audible indicator in response to the detected ambient sound level.

2. The system of claim 1 wherein the indicator includes a sound enunciator located in the raised portion of the housing for radiating audible signals generally in the direction of the system operator.

3. The system of claim 1 wherein a function whose occurrence is indicated is the successful reading of an optical code.

4. The system of claim 1 wherein a function whose occurrence is indicated is the detection of a particular optical code symbology.

5. In an optical code reading system for use by an operator in reading optical code symbols on target objects in a noisy environment, said system having a horizontal surface for supporting target objects and an associated housing containing at least one optical code reading module, a system for automatically controlling the volume level of an audible signal provided to the operator by the system comprising:

a sound level detector for detecting a sound level in a vicinity of the code reading terminal;

an audible signal generator for producing an audible indication of an event at the code reading terminal; and means for automatically controlling a volume of the audible indication in response to the detected sound level.

6. The system of claim 5, wherein the sound level detector includes a microphone and means for comparing the volume of sound detected by the microphone with a predetermined value and producing a control signal proportioned in response thereto.

7. The system of claim 6, wherein the audible signal generator includes:
   an audio signal generator;
   an audio amplifier whose output level is controlled by said control signal; and
   means for producing audible sound in response to an output signal of the audio amplifier.

8. The system of claim 7, wherein the audio signal generator generates a plurality of different tones in response to different events at the code reading station.

9. The system of claim 7, wherein the audio signal generator is a sound synthesizer which produces preselected sounds in response to information decoded from a detected code symbol.

10. The system of claim 7, wherein the microphone and sound producing means are located in the vicinity of the system operator and wherein the predetermined value is selected so that the audible signal can be heard by the operator over ambient sound present in the vicinity of the operator.

11. The system of claim 7, wherein the sound producing means is located in a side rail adjacent to a horizontal surface for supporting articles having optical code on them.

12. The system of claim 7, further comprising control means for manually adjusting the predetermined value.

13. The system of claim 7, wherein the sound producing means is a speaker located in a housing of the optical code reading terminal adjacent a position where an operator of the system is located.

14. The system of claim 7, wherein the sound producing means is a beeper located in a housing of the optical code reading terminal adjacent a position where an operator of the system is located.

15. The system of claim 7, wherein one sound is produced when a one-dimensional code is detected and a different sound is produced when a two-dimensional code is detected.

16. The system of claim 15, wherein a third sound is produced when both one-dimensional and two-dimensional codes are detected.

17. An optical code reading system for use by an operator in reading optical code symbols on target objects in the vicinity of the terminal and for providing an audible indication whose volume is automatically adjusted to compensate for a noisy environment comprising:
   at least one optical code reading module capable of reading plural optical code symbologies;
   a code processor for identifying the symbology of optical code symbols detected in a field of view of the at least one optical code reading module;
   a sound level detector for detecting a sound level in a vicinity of the code reading terminal;
   an audible signal generator for generating a predetermined one of a plurality of distinctive audible signals corresponding to a particular code symbology when an optical code symbol of such symbology is identified by the code reading system; and
   means for automatically controlling the volume of at least one of the plurality of audible signals in response to the detected sound level.

18. The system of claim 17, wherein the sound generator produces a tone selected by a user of the optical code reading system to distinguish audio signals from the system from nearby optical code reading systems.

19. The system of claim 18, wherein the sound level detection includes a microphone for monitoring an ambient noise level and a comparator for comparing the monitored level to a predetermined threshold level; and wherein the audible sound generator includes:
   an audio amplifier for amplifying and outputting an audio signal, the magnitude of amplification depending on an output of the comparator; and
   a sound transducer proximal to an operator of the system for outputting the amplified audio signal.

20. The system of claim 19, wherein the sound transducer is a speaker locate in a housing containing a code reading module which housing is adjacent to and raised up from a horizontal support surface for objects carrying code symbols and which housing is adjacent to a location of an operator of the system.

21. The system of claim 17, wherein the audible signal generator includes multiple enunciators in different locations.

22. The system of claim 17, wherein the audible signal generator includes multiple enunciators, each producing a sound having a different phase.

23. The system of claim 17, wherein the audible signal generator includes multiple enunciators, each producing a sound having a different frequency.

* * * * *